(12) United States Patent
Dearth et al.

(10) Patent No.: US 12,452,164 B2
(45) Date of Patent: Oct. 21, 2025

(54) FAST NETWORK RECOVERY USING HOT SWAP OF NETWORK ADDRESSES

(71) Applicant: MELLANOX TECHNOLOGIES, LTD., Yokneam (IL)

(72) Inventors: Glenn Dearth, Groton, MA (US); Alex Netes, Rehovot (IL); Nitin Hande, Sunnyvale, CA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 18/166,398

(22) Filed: Feb. 8, 2023

(65) Prior Publication Data

US 2024/0267320 A1    Aug. 8, 2024

(51) Int. Cl.
*H04L 45/00* (2022.01)
*H04L 45/28* (2022.01)
*H04L 45/42* (2022.01)

(52) U.S. Cl.
CPC .............. *H04L 45/22* (2013.01); *H04L 45/28* (2013.01); *H04L 45/42* (2013.01)

(58) Field of Classification Search
None
See application file for complete search history.

(56) References Cited

U.S. PATENT DOCUMENTS

| | | | | |
|---|---|---|---|---|
| 6,978,300 B1 * | 12/2005 | Beukema | ............. | H04L 41/082 370/235 |
| 11,709,741 B1 * | 7/2023 | Uppal | ................ | G06F 11/2023 714/4.11 |
| 2003/0021223 A1 * | 1/2003 | Kashyap | ............. | H04L 41/0663 709/239 |
| 2005/0238035 A1 * | 10/2005 | Riley | ..................... | H04L 49/35 370/401 |
| 2006/0262784 A1 * | 11/2006 | Cheethirala | ......... | H04L 67/1097 370/389 |
| 2011/0085545 A1 * | 4/2011 | Tadimeti | ................. | H04L 45/76 370/389 |
| 2014/0040659 A1 * | 2/2014 | Wassermann | ....... | H04L 41/0663 714/E11.073 |

(Continued)

OTHER PUBLICATIONS

"InfiniBand™ Architecture Specification vol. 1," InfiniBand Trade Association, Nov. 2007, Release 1.2.1, 1727 pages.

*Primary Examiner* — Joshua Joo
(74) *Attorney, Agent, or Firm* — Sheridan Ross P.C.

(57) ABSTRACT

A system includes a routing fabric and management circuitry. The routing fabric connects processing devices. The management circuitry determines an event associated with a first routing path included in the routing fabric. The management circuitry identifies a processing partition that is affected by the event based on a first local identifier. The first local identifier is associated with the first routing path and is assigned to the processing partition, and the processing partition is associated with one or more of the processing devices. The management circuitry routes one or more processes associated with the processing partition based on a second local identifier. The second local identifier is associated with a second routing path included in the routing path and is assigned to the processing partition. The one or more processes are routed using the second routing path.

19 Claims, 7 Drawing Sheets

(56) References Cited

U.S. PATENT DOCUMENTS

2014/0133360 A1* 5/2014 Chiueh .................. H04L 41/12
370/256
2015/0271104 A1* 9/2015 Chikkamath ....... H04L 12/4633
370/401
2015/0372898 A1* 12/2015 Haramaty ............ H04L 49/557
370/225
2018/0278578 A1* 9/2018 Johnsen .............. H04L 61/5069

* cited by examiner

FAST NETWORK RECOVERY USING HOT SWAP OF NETWORK ADDRESSES

FIELD OF TECHNOLOGY

The present disclosure relates to computer networks, and particularly to configuring and reconfiguring routes between processing devices associated with the computer networks.

BACKGROUND

Some communication systems support multi node communication within and between servers over communication routes. Improved techniques for configuring communication routes are desired.

SUMMARY

Examples may include one of the following features, or any combination thereof.

An apparatus including: a processor; and memory in electronic communication with the processor. Instructions stored in the memory are executable by the processor to: determine an event associated with a first routing path; identify a processing partition that is affected by the event based on a first local identifier, wherein the first local identifier is associated with the first routing path and is assigned to the processing partition; and route one or more processes associated with the processing partition based on a second local identifier, wherein the second local identifier is associated with a second routing path and is assigned to the processing partition, and wherein the one or more processes are routed using the second routing path.

In some aspects, the instructions are further executable by the processor to, in response to identifying the processing partition: set a status associated with the first local identifier to an in-use status; and set a status associated with the second local identifier to the in-use status.

In some aspects, the instructions are further executable by the processor to, in response to identifying the processing partition: identify one or more host channel adapters associated with the processing partition; and configure a link of the one or more host channel adapters to use secondary local identifiers associated with routing the one or more processes.

In some aspects, the instructions are further executable by the processor to, in response to confirming activation of a drain state of the one or more host channel adapters: transfer routing of the one or more processes to the second routing path; and remove the first routing path.

In some aspects, the event includes a failure event or a predicted failure event associated with routing the one or more processes using the first routing path.

In some aspects, the apparatus further includes: a routing fabric connecting a plurality of host channel adapters, wherein the processing partition is associated with one or more host channel adapters of the plurality of host channel adapters.

In some aspects, the first local identifier is a primary local identifier assigned to a host channel adapter associated with the processing partition; and the second local identifier is a secondary local identifier assigned to the host channel adapter.

In some aspects, the instructions are further executable by the processor to: assign a plurality of primary local identifiers and a plurality of secondary local identifiers to a plurality of host channel adapters. In some aspects, the plurality of primary local identifiers include the first local identifier. In some aspects, the plurality of secondary local identifiers include the second local identifier.

In some aspects, the instructions are further executable by the processor to: generate a plurality of processing partitions associated with one or more host channel adapters, the plurality of processing partitions including at least the processing partition; create the first routing path for the processing partition based on the first local identifier; and create the second routing path for the processing partition based on the second local identifier.

In some aspects, the instructions are further executable by the processor to generate a plurality of processing partitions associated with a plurality of host channel adapters, wherein: the plurality of processing partitions include at least the processing partition; and a set of host channel adapters of the plurality of host channel adapters is associated with the processing partition. In some aspects, the instructions are further executable by the processor to create one or more primary routing paths between the set of host channel adapters associated with the processing partition, wherein creating the one or more primary routing paths is based on primary local identifiers respectively assigned to the set of host channel adapters. In some aspects, the instructions are further executable by the processor to create one or more secondary routing paths between the set of host channel adapters associated with the processing partition, wherein creating the one or more secondary routing paths is based on secondary local identifiers respectively assigned to the set of host channel adapters.

In some aspects, the instructions are further executable by the processor to: activate the processing partition based on primary local identifiers associated with routing the one or more processes, wherein the primary local identifiers include at least the first local identifier.

In some aspects, the instructions are further executable by the processor to: identify a second processing partition that is not affected by the event; identify one or more second host channel adapters associated with the second processing partition; and route one or more second processes associated with the second processing partition based on a primary local identifier assigned to the second processing partition.

In some aspects, the instructions are further executable by the processor to: identify that the second processing partition is affected by a second event associated with a third routing path; and route the one or more second processes using a fourth routing path associated with a secondary local identifier assigned to the second processing partition.

In some aspects, the instructions are further executable by the processor to transfer routing of the one or more processes to the second routing path. In some aspects, the one or more processes are associated with an application on a host channel adapter associated with the processing partition. In some aspects, the transfer of the routing to the second routing path is transparent to the application.

A system including: a routing fabric connecting a plurality of processing devices; and management circuitry. In some aspects, the management circuitry is to: determine an event associated with a first routing path included in the routing fabric: identify a processing partition that is affected by the event based on a first local identifier, wherein the first local identifier is associated with the first routing path and is assigned to the processing partition, and wherein the processing partition is associated with one or more processing devices of the plurality of processing devices; and route one or more processes associated with the processing partition based on a second local identifier, wherein the second local identifier is associated with a second routing path included in the routing path and is assigned to the processing partition, and wherein the one or more processes are routed using the second routing path.

In some aspects, the plurality of processing devices include a plurality of host channel adapters.

In some aspects, the management circuitry is to, in response to identifying the processing partition: set a status associated with the first local identifier to an in-use status; and set a status associated with the second local identifier to the in-use status.

In some aspects, the management circuitry is to, in response to identifying the processing partition: identify one or more processing devices associated with the processing partition; and configure a link of the one or more processing devices to use secondary local identifiers associated with routing the one or more processes.

In some aspects, the management circuitry is to, in response to confirming activation of a drain state of the one or more processing devices: transfer routing of the one or more processes to the second routing path; and remove the first routing path.

A method including: determining an event associated with a first routing path included in a routing fabric connecting a plurality of host channel adapters; identifying a processing partition that is affected by the event based on a first local identifier, wherein the first local identifier is associated with the first routing path and is assigned to the processing partition; and routing one or more processes associated with the processing partition based on a second local identifier, wherein the second local identifier is associated with a second routing path and is assigned to the processing partition, and wherein the one or more processes are routed using the second routing path.

DETAILED DESCRIPTION

Figure 1:
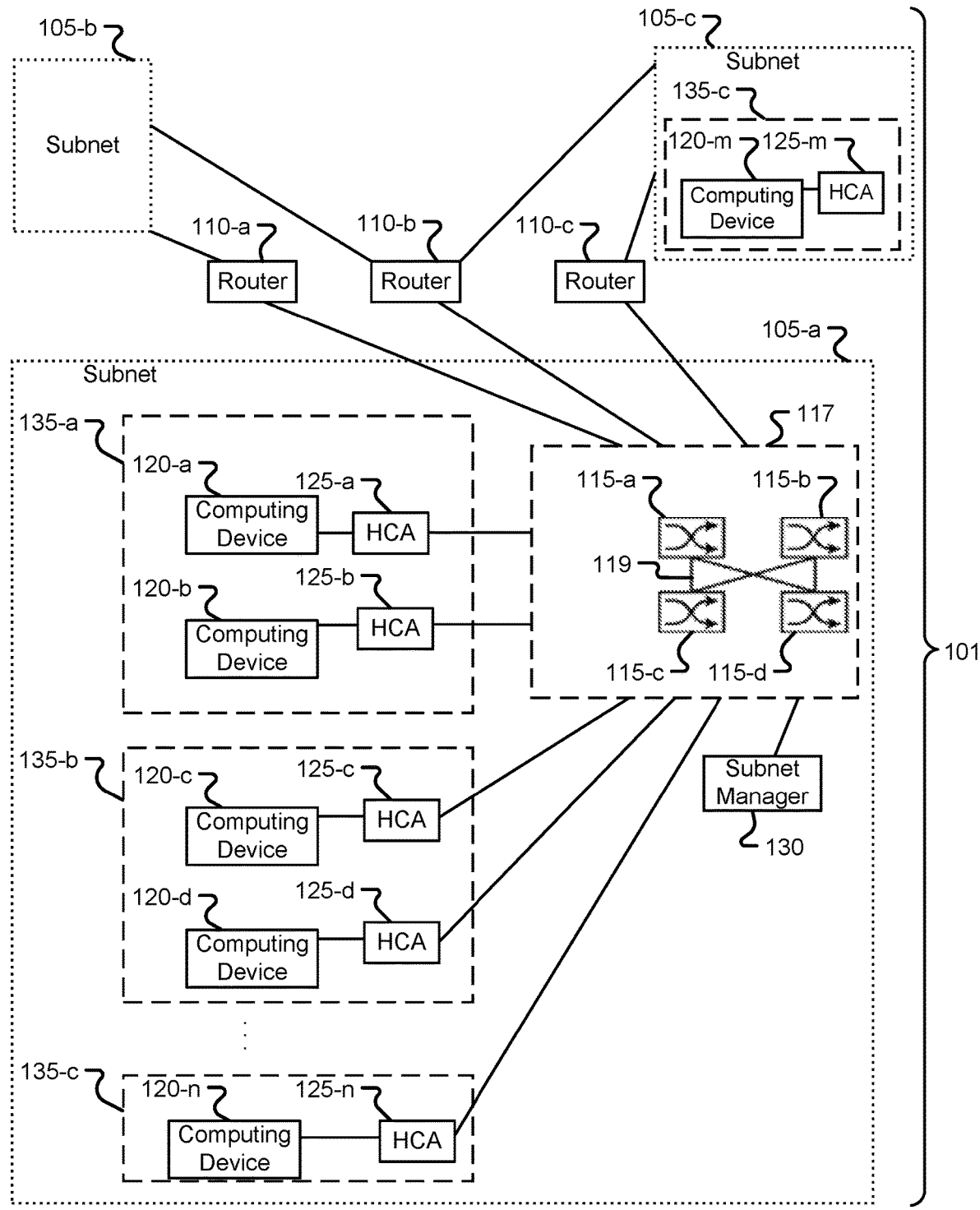
FIG. 1 illustrates an example of a system in accordance with aspects of the present disclosure.

The ensuing description provides example aspects of the present disclosure, and is not intended to limit the scope, applicability, or configuration of the claims. Rather, the ensuing description will provide those skilled in the art with an enabling description for implementing the described examples. It being understood that various changes may be made in the function and arrangement of elements without departing from the spirit and scope of the appended claims. Various aspects of the present disclosure will be described herein with reference to drawings that are schematic illustrations of idealized configurations.

InfiniBand™ (IB) is a switched-fabric communications link primarily used in high-performance computing. It has been standardized by the InfiniBand Trade Association. Computing devices (host processors and peripherals) connect to the IB fabric via a network interface adapter, which is referred to in IB parlance as a channel adapter. Host processors (or hosts) use a host channel adapter (HCA), while peripheral devices use a target channel adapter (TCA). HCAs provide a managed system with port connections to other devices. For example, via a port connection, an HCA may be connected to another HCA, a target device, or a switch.

NVLink™ is a wire-based communications protocol for near-range semiconductor communications that can be used for data and control code transfers in processor systems between CPUs and GPUs and, in some implementations, solely between GPUs. NVLink™ is a high-speed datalink interconnect fabric which provides increased data transfer speed between GPU compute components. NVLink™ is a fabric interconnect arrangement that enables GPUs to communicate with one another as peers over fast, highly scalable multiprocessor interconnects that avoid the bandwidth bottleneck of slower kinds of data links. For example, NVLink™ enables a GPU to access the local memory of another GPU almost as if the local memory were its own, allowing a developer to pool the memory resources of multiple GPUs. NVLink™ provides higher speeds compared to PCIe or other such datalinks that provide access to main memory, system memory, or other memory devices attached to the PCIe fabric.

A subnetwork (also referred to herein as a subnet) is a logical subdivision of a Layer-3 network. Network ports of nodes within a given subnet share the same Layer-3 network address prefix. For example, in Internet Protocol (IP) networks, the ports in each subnet share the same most-significant bit-group in their IP address, so that the IP address is logically divided into two fields: a network or routing prefix, and the rest field or host identifier. Similarly, in InfiniBand™ (IB) networks, each subnet is uniquely identified with a subnet identifier known as the Subnet Prefix. For each port in the subnet, this prefix is combined with a respective Globally-Unique Identifier (GUID) to give the IB Layer-3 address of the port, known as the Global Identifier (GID).

In some cases, the logical subdivision of a Layer-3 network into subnets reflects the underlying physical division of the network into Layer-2 local area networks. The subnets are connected to one another by routers, which forward packets on the basis of their Layer-3 (IP or GID) destination addresses, while within a given subnet packets are forwarded among ports by Layer-2 switches or bridges. The Layer-2 devices operate in accordance with the applicable Layer-2 protocol and forward packets within the subnet according to the Layer-2 destination address, such as the Ethernet™ medium access control (MAC) address or the IB link-layer Local Identifier (LID). In general, Layer-2 addresses in a subnet are recognized within that subnet, and routers will swap the Layer-2 address information of packets that the routers forward from one subnet to another.

In IB networks, a subnet manager (SM) in each subnet assigns an LID to each physical port of each host within the given subnet. A subnet administration (SA) function provides nodes with information gathered by the subnet manager, including communication of the LID information to a subnet management agent (SMA) in each node of the subnet. For simplicity and clarity in the description that follows, the described subnet management and administration functions will be assumed to be carried out by the subnet manager. Layer-2 switches within the subnet are configured by the subnet manager to forward packets among the ports on the basis of the destination LID (D-LID) in the packet header. The subnet manager may be implemented as a software process running on a suitable computing platform in one of the nodes (e.g., a host computer, a switch, an appliance, etc.) in the subnet.

Some communication systems support multi-node communication within and between servers over communication routes. Some approaches include reconfiguring unicast and multicast forwarding routes between HCAs for cases in which 1) new cables are added to a system or 2) cables are removed from forwarding routes (e.g., based on predictions of cable behavior). Present techniques lack a mechanism that can swap forwarding routes without interrupting a running job that uses such routes.

Example mechanisms are described that enable fixing or enhancing forwarding routes without pausing or terminating running jobs that use such routes. For example, during system initialization, a subnet manager may assign a primary local identifier address (e.g., LID, LID address, etc.) for immediate use and an alternate local identifier (also referred to herein as a secondary local identifier) for cases of link failure/rerouting per channel adapter port (e.g., HCA port, TCA port, etc.). The techniques include creating multiple partitions. During partition creation, the subnet manager may create routing between all HCAs participating in a partition based on the primary local identifiers.

For a failure event in the routing fabric, the subnet manager may identify a partition affected by the failure event. The failure event may be, for example, a link failure associated with a routing path. For the affected partition, the subnet manager may create an alternate routing (e.g., an alternate routing path) based on alternate local identifiers for the partition. When the alternate routing is ready for the partition, the subnet manager may inform the HCAs in the partition to use the alternate set of local identifiers. In some aspects, the subnet manger may swap to using alternate local identifiers for non-affected partitions in the fabric when the non-affected partitions would be deallocated.

It is to be understood that example aspects of the present disclosure described herein may be applied in InfiniBand implementations (e.g., including HCAs) and/or NVLink implementations (e.g., including GPUs). It is to be understood that aspects of the present disclosure may be applied to any network adapter (e.g., a network interface controller (NIC)) other than HCAs.

Aspects of the disclosure are further illustrated by and described with reference to apparatus diagrams, system diagrams, and flowcharts that relate to fast network recovery using hot swap of network addresses.

FIG. 1 illustrates an example of system 100 in accordance with aspects of the present disclosure. The system 100 includes a network 101 (e.g., a computer network), in accordance with example implementations of the present invention. In some aspects, the network 101 may operate in accordance with IB specifications. In some other aspects, the principles of the present example implementation may similarly be applied in other Layer-3 networks that have a subnet management function similar to the subnet management function defined in IB networks. Example features of the IB architecture supported by the network 101 are described in the InfiniBand™ Architecture Specification Volume 1 (Release 1.2.1, November 2007), distributed by the InfiniBand Trade Association and incorporated herein by reference, and particularly in Chapter 14: "Subnet Management" and Chapter 19: "Routers."

Network 101 includes multiple subnets 105 (e.g., subnet 105-a through subnet 105-c), which are interconnected by routers 110. In an example, router 110-a through router 110-c may be Layer-3 routers. Each subnet 105 includes multiple switches 115. In an example, switches 115 may be Layer-2 switches. Switches 115 may connect to host computing devices 120 (e.g., host computing device 120-a through host computing device 120-n) via HCAs 125 (e.g., HCA 125-a through HCA 125-n). In the example of FIG. 1, the host computing devices 120 may be referred to as host processing devices.

Switches 115 within each subnet 105 may be interconnected in any suitable topology. Example topologies supported by the system 100 and the switches 115 include a "fat tree" topology or an NVLink network topology, but are not limited thereto. In some aspects, the switches 115 may be included in or form a routing fabric 117. The routing fabric 117 may be a PCI-e based fabric. In some aspects, the routing fabric 117 may be a switched fabric architecture (e.g., InfiniBand™, NVLink™ fabric, etc.) that supports all-to-all communication.

One or more of the switches 115 may connect to routers 110 and enable packet transfer between subnets 105. In the example implementation of FIG. 1, any given pair of subnets 105 is separated by no more than a single routing hop, but the principles of the present invention may also be extended to networks in which traffic between certain subnets traverse two or more routers 110 in sequence. In some cases, each pair of subnets 105 may be connected by two or more routers 110 for purposes of load balancing and failure protection.

It is to be understood that example aspects of the present disclosure described with reference to the interconnection between a device (e.g., a router 110, an HCA 125, a host computing device 120, etc.) and the routing fabric 117 include interconnection between the device and one or more switches 115 of the routing fabric 117.

A subnet manager 130 in each subnet 105 may perform management and administration functions defined by the above-mentioned IB specification, as well as additional routing functions that are described herein. In some example implementations, a subnet 105 may include multiple subnet managers 130 to provide backup in case of failure. In such example implementations, a single subnet manager 130 of the subnet 105 is active in performing the functions described herein at a given time.

Subnet manager 130 may be implemented as a combined hardware/software element including a computing platform. The computing platform may be an embedded or standalone central processing unit (CPU) running management software that performs the functions described herein. The CPU may include a memory and suitable interfaces for implementing the management software and performing the functions.

The computing platform may be dedicated to subnet management functions. Additionally, or alternatively, the computing platform may be shared with other computing and communication functions. The software components of the subnet manager 130 may be downloaded to the computing platform in electronic form, for example over network 101 or via a separate control network (not illustrated). Alternatively or additionally, the software components may be stored on tangible, non-transitory computer-readable media (e.g., optical memory, magnetic memory, electronic memory, etc.) of a system that is associated with or includes the network 101.

The subnet manager 130 in each subnet 105 (e.g., subnet manager 130 of subnet 105-a) assigns a Layer-2 address to each port of each switch 115 and each port of each host computing device 120 within the subnet 105. The Layer-2 address may be assigned in the form of a LID. In some examples, the Layer-2 address may include a multicast LID (MLID).

The subnet manager 130 may provide each port a GID Layer-3 address. In some aspects, all ports in a given subnet 105 may have the same GID prefix, as explained herein. Each subnet manager 130 may learn the topology of the subnet 105 respective to the subnet manager 130 using methods defined by the IB specification (e.g., transmission and reception of suitable management packets, for example Direct Route Management Datagrams). By transmitting and receiving such packets to and from routers 110, the subnet managers 130 may learn which other subnets 105 are connected to each router 110, as well as collecting information regarding other network features (e.g., multicast groups). Alternatively or additionally, routers 110 may autonomously publish subnet connections respective to the routers 110 to the subnet managers 130.

By such example mechanisms, subnet manager 130 in subnet 105-a may discover, for example, that subnet 105-a is connected by both router 110-a and router 110-b to subnet 105-b, and further, that subnet 105-a is connected by router 110-c to subnet 105-c. The subnet managers 130 may store the intra- and inter-subnet topology information described herein in memories respective to the subnet managers 130. In some aspects, the subnet managers 130 may use the intra- and inter-subnet topology information in association with making routing decisions, and the subnet managers 130 may update the information periodically when changes occur (e.g., due to failure events or reconfiguration as described herein).

According to example aspects of the present disclosure, the system 100 may support network recovery using hot swap of network addresses. For example, the system 100 may support routing processes associated with a processing partition 135 using primary local identifiers and, further, rerouting the processes using secondary local identifiers in response to a failure event. Example aspects of the routing and rerouting processes are described with reference to the following figures.

Figure 2:
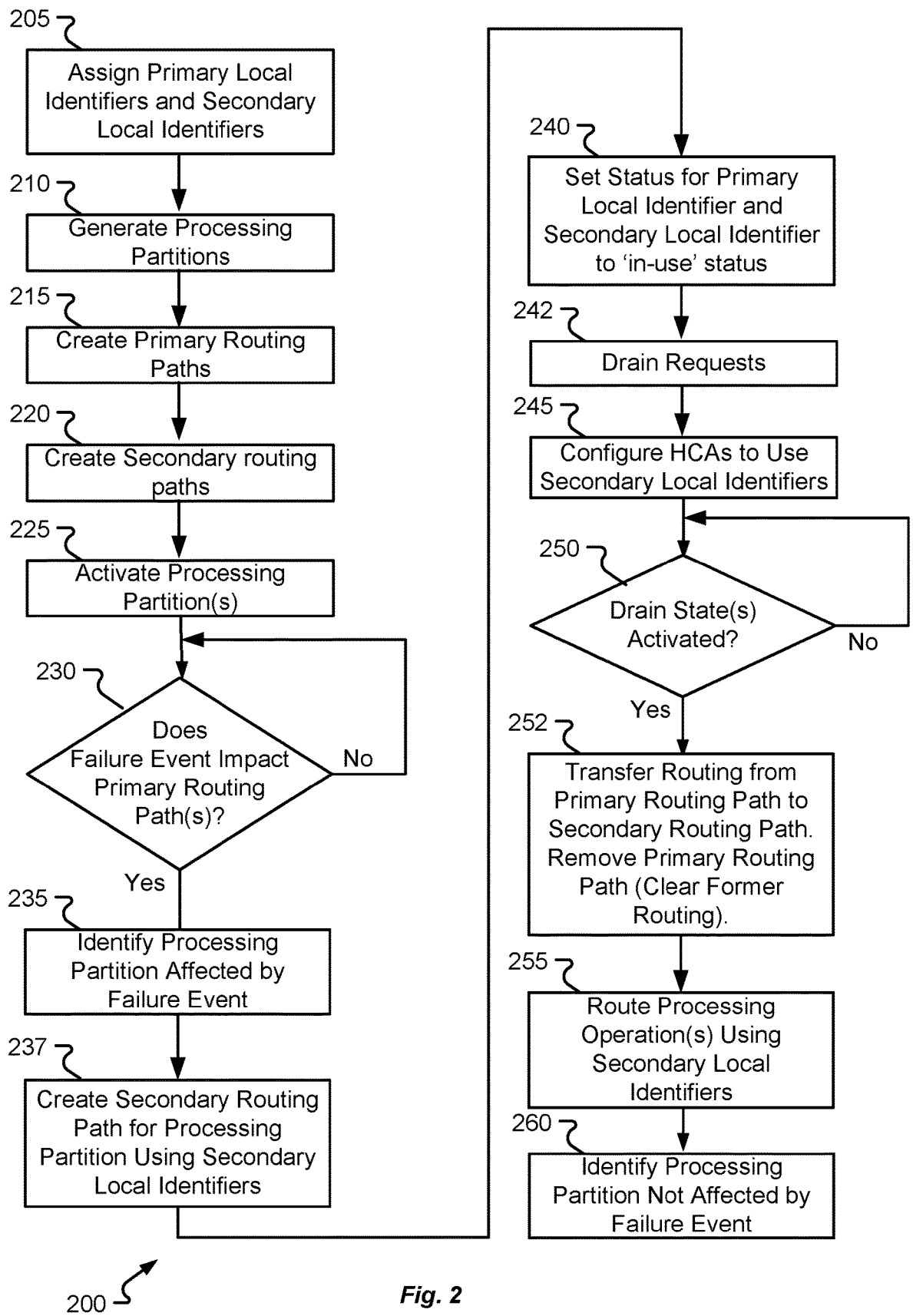
FIG. 2 illustrates an example of a process flow in accordance with aspects of the present disclosure.

FIG. 2 illustrates an example of a process flow 200 in accordance with aspects of the present disclosure. In some examples, process flow 200 may implement aspects of the system 100 described with reference to FIG. 1. For example, the process flow 200 may be implemented by the devices of the system 100 described herein.

In the following description of the process flow 200, the operations may be performed in a different order than the order shown, or the operations may be performed in different orders or at different times. Certain operations may also be left out of the process flow 200, or other operations may be added to the process flow 200.

In an example, at 205, the subnet manager 130 may assign primary local identifiers and secondary local identifiers to HCAs 125. In some aspects, the subnet manager 130 may assign the primary local identifiers and secondary local identifiers to ports (not illustrated) of the HCAs 125. The ports of the HCAs 125 may also be referred to herein as "channel adapter ports" or "HCA ports." In an example, the subnet manager 130 may assign the primary local identifiers and secondary local identifiers during a system initialization process.

In some aspects, the system 100 may store the primary local identifiers and/or the secondary local identifiers in a mapping table stored in a memory device of the system 100. The subnet manager 130 may access the mapping table and secondary local identifiers for cases of link failure or routing reconfiguration as described herein.

At 210, the process flow 200 may include generating processing partitions 135 (e.g., processing partition 135-a, processing partition 135-b, etc.) associated with network 101. In some aspects, one or more HCAs 125 (and associated host computing devices 120) may be associated with each processing partition 135.

In some aspects, a processing partition 135 may include host computing devices 120 of the same subnet 105. For example, host computing device 120-a and host computing device 120-b (and corresponding HCA 125-a and HCA 125-b) may be associated with processing partition 135-a. In another example, host computing device 120-c and host computing device 120-d (and corresponding HCA 125-c and HCA 125-d) may be associated with processing partition 135-b.

In some example aspects, a processing partition 135 may include devices (e.g., host computing devices 120, HCAs 125, etc.) associated with different subnets 105. For example, host computing device 120-n (and corresponding HCA 125-n) of subnet 105-a and host computing device 120-m (and corresponding HCA 125-m) of subnet 105-c may be associated with processing partition 135-c.

At 215, the subnet manager 130 may create primary routing paths for each processing partition 135 of the subnet 105-a. For example, for subnet 105-a, the subnet manager 130 may create one or more primary routing paths between the HCA 125-a through HCA 125-n, based on primary local identifiers respectively assigned to the HCA 125-a through HCA 125-n. In an example, the subnet manager 130 may create a primary routing path between HCA 125-a and HCA 125-b, via the routing fabric 117, in which the primary routing path is based on a primary local identifier assigned to HCA 125-a and a primary local identifier assigned to HCA 125-b.

At 220, the subnet manager 130 may create secondary routing paths for each processing partition 135 of the subnet 105-a. For example, for processing partition 135-a, the subnet manager 130 may create one or more secondary routing paths between HCA 125-a and HCA 125-b, based on secondary local identifiers respectively assigned to HCA 125-a and HCA 125-b. In the example described with reference to HCA 125-a and HCA 125-b, the subnet manager 130 may create a secondary routing path (e.g., via the routing fabric 117) between HCA 125-a and HCA 125-b. In some aspects, the secondary routing path is linked to a secondary local identifier assigned to HCA 125-a and a secondary local identifier assigned to HCA 125-b.

At 225, the system 100 may activate the processing partition 135-a. For example, the system 100 may activate the processing partition 135-a by activating the primary local identifiers. In some aspects, a global fabric manager of the system 100 may implement the activation. In some aspects, at 225, the system 100 may activate all processing partitions 135 by activating primary local identifiers associated with the processing partitions 135.

At 230, the system 100 may determine whether a failure event associated with the routing fabric 117 will impact any of the primary routing paths. The failure event may be an actual failure event (e.g., component failure at a switch 115, a link 119 between switches 115, etc.) or a predicted failure event (e.g., planned maintenance or replacement of a switch 115, a link 119, etc.) associated with the routing fabric 117. In an example, the links 119 may be physical links between switches 115.

In an example, the link 119 may be included in the primary routing path between HCA 125-a and HCA 125-b. Accordingly, for example, the system 100 may identify that the failure event associated with the link 119 will negatively impact the primary routing path between HCA 125-a and HCA 125-b. In some aspects, the failure event may prevent successful routing of data and/or processes between HCA 125-a and HCA 125-b using the primary routing path.

At 235, in response to determining that a failure event associated with the routing fabric 117 will impact a primary routing path ('Yes' at 230), the system 100 (e.g., the subnet manager 130) may identify a processing partition 135 that is affected by the failure event. For example, the system 100 may identify primary local identifiers that are associated with the primary routing path affected by the failure event. In an example, the system 100 may determine that respective primary local identifiers associated with HCA 125-a and HCA 125-b are associated with the primary routing path. Accordingly, for example, from the primary local identifiers, the system 100 may identify that HCA 125-a and HCA 125-b (and processing partition 135-a) are affected by the failure event.

At 237, the system 100 may create a secondary routing path for the processing partition 135 using secondary local identifiers, in which the secondary routing path connects the HCA 125-a to HCA 125-b. In some examples, the system 100 may select the secondary routing path from among the secondary routing paths created at 220.

In some aspects, in creating/selecting the secondary routing path, the system 100 may respectively apply the secondary local identifiers (as described with reference to 205 and 215) to HCA 125-a and HCA 125-b.

Accordingly, for example, aspects of the present disclosure support creating and/or selecting a secondary routing path (e.g., a correct routing path) during a failure event so as to maintain uninterrupted processing operations associated with an affected processing partition 135 (e.g., processing partition 135-a). In creating and/or selecting the secondary routing path, the system 100 assigns routing associated with the processing operations to the secondary local identifiers.

At 240, the system 100 (e.g., subnet manager 130) may set a status associated with the primary local identifier to an 'in-use' status and set a status associated with the secondary local identifier to the 'in-use' status. In some aspects, the system 100 may set (or mark) all primary local identifiers and secondary local identifiers associated with the processing partition 135 to the 'in-use' status.

At 242, the system 100 (e.g., global fabric manager for the system 100) may drain any remaining or existing requests associated with HCA 125-a, HCA 125-b, and/or the primary routing path. For example, the system 100 may activate a drain state of HCA 125-a and activate a drain state of HCA 125-b. That is, for example, for an HCA 125 (or multiple HCAs 125) affected by the failure event, the system 100 may activate a drain state for the HCA 125 (or HCAs 125).

At 245, the system 100 (e.g., a global fabric manager for the system 100) may configure HCA 125-a and HCA 125-b to use the secondary local identifiers respectively assigned to HCA 125-a and HCA 125-b. For example, the system 100 may configure HCA 125-a and HCA 125-b to use the secondary local identifiers (and the secondary routing path) for routing the processing operations which were initially associated with the primary local identifiers (and the primary routing path). In some aspects, the system 100 may configure a different link 119 between the HCA 125-a and the HCA 125-b to use the secondary local identifiers.

In some non-limiting examples, any combination of 237, 240, 242, and 245 of the process flow 200 described herein may be implemented in response to identifying a processing partition 135 (e.g., processing partition 135-a) affected by the failure event, as described with reference to 235.

At 250, the subnet manager 130 may confirm whether the drain state of HCA 125-a and the drain state of HCA 125-b are activated. For example, for an HCA 125 (or multiple HCAs 125) affected by the failure event, the subnet manager 130 may confirm whether the drain state for the HCA 125 (or HCAs 125) is activated.

In an example, in response to confirming (at 250) the drain state of HCA 125-a and HCA 125-b are activated (e.g., 'Yes'), the subnet manager 130 may transfer (at 252) routing of the processing operations from the primary routing path to the secondary routing path, and the subnet manager 130 may discontinue use of the primary routing path. Accordingly, for example, at 252, the subnet manager 130 may clear the former routing (e.g., clear use of the primary routing path) by swapping-in the secondary local identifiers as the identifiers that are 'in-use,' and in some aspects, by marking the primary local identifier and the primary local identifier as 'not in-use.' Accordingly, for example, the subnet manager 130 may support hot swapping between the primary local identifiers and secondary local identifiers.

Additionally, or alternatively, if the subnet manager 130 determines (at 250) that the drain states are not yet activated (e.g., 'No'), the subnet manager 130 may wait a duration before again confirming whether the drain state of HCA 125-a and the drain state of HCA 125-b are activated.

At 255, the system 100 may route one or more of the processing operations associated with the processing partition 135-a using the secondary local identifiers associated with HCA 125-a and HCA 125-b.

Aspects of the process flow 200 as described herein support fixing or enhancing forwarding of data without stopping running jobs. For example, aspects of the present disclosure may refrain from clearing the former routing (e.g., use of the primary routing path) until the secondary local identifiers have been swapped-in as the identifiers that are 'in-use.'

In some aspects, the processing operations associated with the processing partition 135 may be associated with an application on HCA 125-a (or host computing device 120-a) and/or an application on HCA 125-b (or host computing device 120-b). In some examples, the application may be running on a GPU (not illustrated) of the host computing device 120-a and/or a GPU (not illustrated) of the host computing device 120-b. The techniques described herein of transferring routing of the processing operations from the primary routing path to the secondary routing path may be transparent to the application, which may provide technical improvements of minimized or reduced transition durations compared to other routing recovery techniques. In some aspects, providing such minimized or reduced transition durations may mitigate and/or eliminate fabric effects that could cause undesirable timeouts associated with the system 100.

Aspects of the present disclosure support updating and/or resetting routing paths of processing partitions 135 that are not affected by the failure event (e.g., non-affected processing partitions 135). For example, at 260, the system 100 may identify any processing partitions 135 not affected by the failure event. In an example, the system 100 may identify that processing partition 135-b is not affected by the failure event. In the example, HCA 125-c (and corresponding host computing device 120-c), HCA 125-d (and corresponding host computing device 120-*b*), a primary local identifier corresponding to HCA 125-*c*, a secondary local identifier corresponding to HCA 125-*c*, a primary local identifier corresponding to HCA 125-*d*, and a secondary local identifier corresponding to HCA 125-*d* are associated with the processing partition 135-*b*.

Using the example techniques described herein with reference to process flow 200 (e.g., 225 through 255), the system 100 may transfer routing of processing operations from a primary routing path between HCA 125-*c* and HCA 125-*d* to a secondary routing path, even if the processing partition 135-*b* (and HCA 125-*c* and HCA 125-*d*) is unaffected by the failure event. In an example, using the techniques described herein with reference to 225 through 255, the subnet manager 130 may swap-in the secondary local identifiers corresponding to HCA 125-*c* and HCA 125-*d* as the identifiers that are 'in-use.' The subnet manager 130 may clear the former routing (e.g., use of the primary routing path) by marking the primary local identifiers corresponding to HCA 125-*c* and HCA 125-*d* as 'not in-use.'

Aspects of the present disclosure support running failure recovery and rerouting as described herein in response to any quantity of failures (e.g., identifying and addressing one or more failure events). For example, the system 100 may return to 240 (not illustrated) to determine whether any additional processing partitions 135 are affected by the failure event (identified at 230) or a different failure event. In response to identifying an additional processing partition 135 that is affected by the failure event or a different failure event, the system 100 may implement any features of the process flow 200 as described herein.

Figure 3:
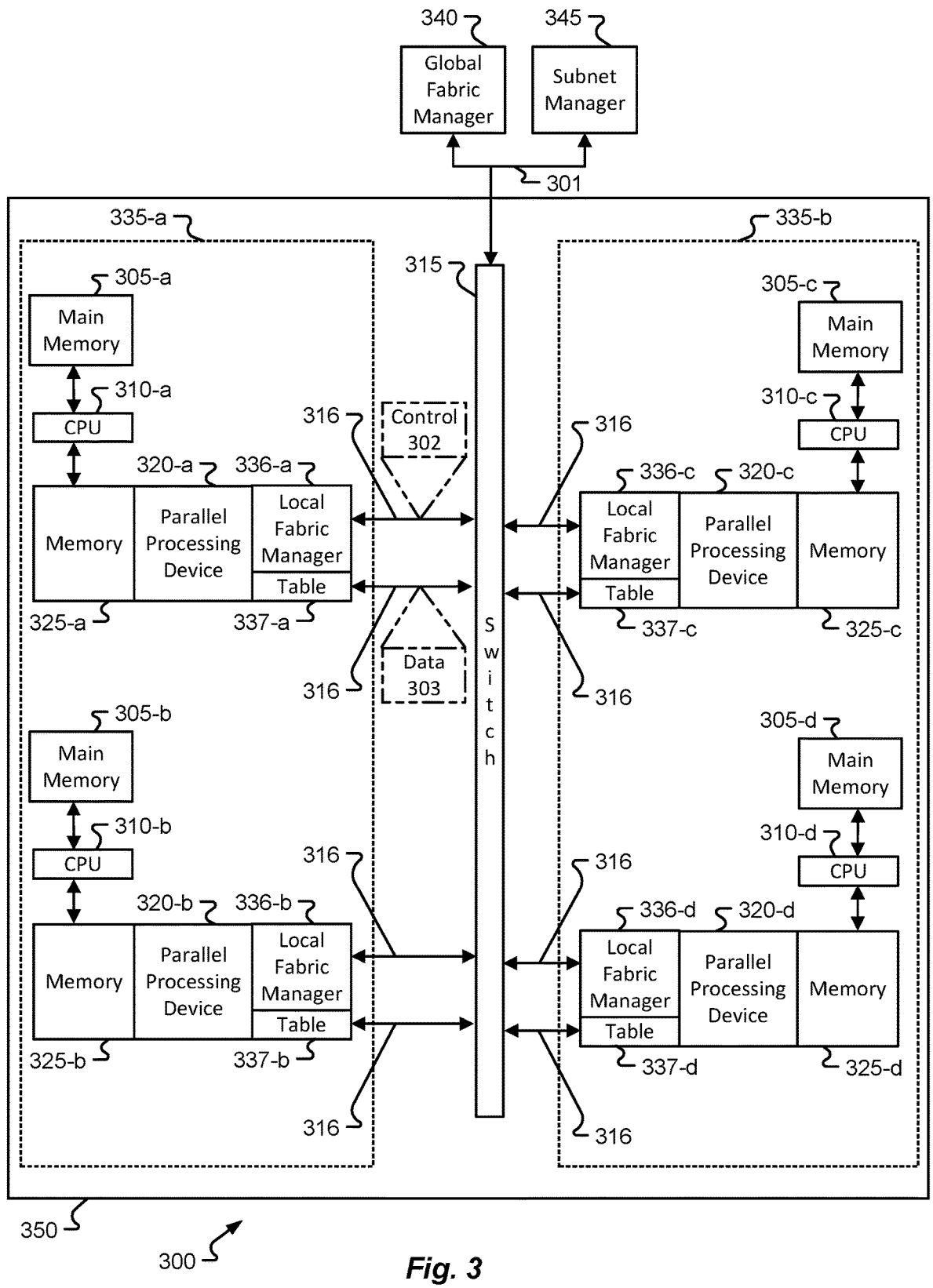
FIG. 3 illustrates an example of a system in accordance with aspects of the present disclosure.

FIG. 3 illustrates an example diagram of a processing system 300 in accordance with aspects of the present disclosure. The processing system 300 may implement aspects of like elements of the system 100 described with reference to FIG. 1. For example, the processing system 300 (and elements included therein) may implement similar or identical aspects of the system 100 (and elements included therein). The processing system 300 may include multiple instances of any of the elements described herein.

According to example aspects of the present disclosure, the processing system 300 may support network recovery using hot swap of network addresses. For example, the processing system 300 may support routing processes associated with a processing partition 335 using primary local identifiers and, further, rerouting the processes using alternate local identifiers in response to a failure event. The local identifiers, for example, may be local identifier addresses or network addresses. Example aspects of the routing and rerouting processes are later described with reference to FIG. 4.

The processing system 300 includes a communications bus 301, switch 315 (switching circuitry), and parallel processing devices 320. The communications bus 301 may be implemented using any suitable protocol for communications of the processing system 300. For example, the protocol may include PCI (Peripheral Component Interconnect), PCI-Express, AGP (Accelerated Graphics Port), HyperTransport, or any other bus or point-to-point communication protocol(s). The main memory 305 may be random access memory (RAM), and control logic (e.g., software) and data may be stored in the main memory 305.

The switch 315 interfaces between components (e.g., the global fabric manager 340, the subnet manager 345, local fabric managers 336, parallel processing devices 320, etc.) of the processing system 300. In some aspects, the switch 315 or multiple switches 315 may be implemented in a routing fabric (e.g., routing fabric 117 of FIG. 1) including interconnects 316.

The processing system 300 includes local fabric managers 336 (e.g., local fabric manager 336-*a* through local fabric manager 336-*d*) (also referred to herein as a local fabric management circuitry), a global fabric manager 340 (also referred to herein as global fabric management circuitry), and a subnet manager 345 (also referred to herein as subnet management circuitry). Portions of the processing system 300 (e.g., switch 315 (or multiple switches 315), interconnects 316, parallel processing devices 320, memory devices 325, NVLink interconnect, local fabric manager 336, subnet manager 345, etc.) may be implemented in a subnet 105 described with reference to FIG. 1. Elements of the processing system 300 described herein may be electrically coupled via the communications bus 301, switch 315, one or more interconnects 316, and an NVLink fabric (formed of NVLink interconnects) described herein with reference to FIG. 3.

Each of the parallel processing devices 320 may be electrically coupled to (e.g., directly, or indirectly) a main memory 305, a CPU 310, a local fabric manager 336, a table 337, and a memory device 325. In an example, parallel processing device 320-*a* may be electrically coupled to a main memory 305-*a* and a CPU 310-*a*, a local fabric manager 336-*a*, an LMAP 337-*a*, and a memory device 325-*a* via a system bus or an NVLink fabric. Aspects of the NVLink fabric are later described herein.

Each table 337 may be mapping table that maps memory addresses to network addresses. For example, each table 337 may be a LID mapping (LMAP) table that maps memory addresses to network LID addresses. In some aspects, the tables 337 may also be referred to as a process operation-to-LID mapping tables or device mapping tables.

The global fabric manager 340 may communicate control signals 302 to local fabric managers 336 via the switch 315, in association with features of the global fabric manager 340 and local fabric managers 336 described herein. The subnet manager 345 may communicate data signals 303 to the tables 337 via the switch 315, in association with features of the subnet manager 345 and tables 337 described herein.

In an example implementation described with reference to a parallel processing device 320 (e.g., parallel processing device 320-*a*, etc.), the parallel processing device 320 may be a multi-threaded processor that is implemented on one or more integrated circuit devices. The parallel processing device 320 is a latency hiding architecture designed to process many threads in parallel. A thread (e.g., a thread of execution) is an instantiation of a set of instructions configured to be executed by the parallel processing device 320. In an example implementation, the parallel processing device 320 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other example implementations, the parallel processing device 320 may be utilized for performing general-purpose computations.

One or more parallel processing devices 320 may be configured to accelerate thousands of high performance computing (HPC), data center, and machine learning applications. The parallel processing device(s) 320 may be configured to accelerate deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

The processing system 300 may include an NVLink fabric. The NVLink fabric provides high-speed communication links (e.g., using NVLink interconnects) between each of the parallel processing devices 320. The NVLink fabric enables systems to scale and include one or more parallel processing devices 320 combined with one or more CPUs 310, supports cache coherence between the parallel processing devices 320 and one or more CPUs 310, and CPU mastering. Data and/or commands may be transmitted between parallel processing devices 320 using the NVLink fabric. One or more of the NVLink interconnects forming the NVLink fabric may be implemented as a physical NVLink interconnect, an on-chip interconnect using the same protocol as the NVLink interconnect, or an on-die interconnect using the same protocol as the NVLink interconnect.

In some aspects, one or more parallel processing devices 320 may be connected to a host processor (e.g., CPU 310) or one or more other parallel processing devices 320 via the NVLink fabric (e.g., one or more NVLink interconnects). Each parallel processing device 320 may be connected to a host processor (e.g., CPU 310) or other peripheral devices via one or more interconnects 316 associated with the switch 315 (or switches 315).

The main memories 305, CPUs 310, local fabric managers 336, tables 337, parallel processing devices 320, memory devices 325, and/or NVLink interconnects may be situated on a single semiconductor platform to form a parallel processing module 350. In an example implementation, the switch 315 supports two or more protocols to interface between various different connections and/or links.

In another example implementation (not illustrated), the NVLink fabric may provide one or more high-speed communication links (e.g., NVLink interconnects) between at least one of parallel processing device 320 and a CPU 310. In another example implementation (not illustrated), the switch 315 may provide one or more communication interfaces (e.g., one or more interconnects 316) to at least one of the parallel processing devices 320. The interconnects 316, parallel processing devices 320, memory devices 325, and/or NVLink fabric may be situated on a single semiconductor platform to form a parallel processing module 350.

Aspects of the processing system 300 support a communication link between one or more parallel processing devices 320 and one or more CPUs 310 using any combination of switches 315, interconnects 316 (e.g., directly, or via a switch 315), and NVLink interconnects. Although a particular quantity of switches 315, interconnects 316, and NVLink interconnects are described with reference to FIG. 3, it is to be understood that the quantity of switches 315, interconnects 316, and NVLink interconnects between elements (e.g., CPUs 310, parallel processing devices 320, etc.) is not limited thereto.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 350 may be implemented as a circuit board substrate and each of the parallel processing devices 320 and/or memory devices 325 may be packaged devices. In an example implementation, the switch 315 and the parallel processing module 350 are situated on a single semiconductor platform.

The processing system 300 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 305 and/or the secondary storage. Such computer programs, when executed, enable the processing system 300 to perform various functions described herein. The main memory 305, the storage, and/or any other storage are possible examples of computer-readable media.

Figure 4:
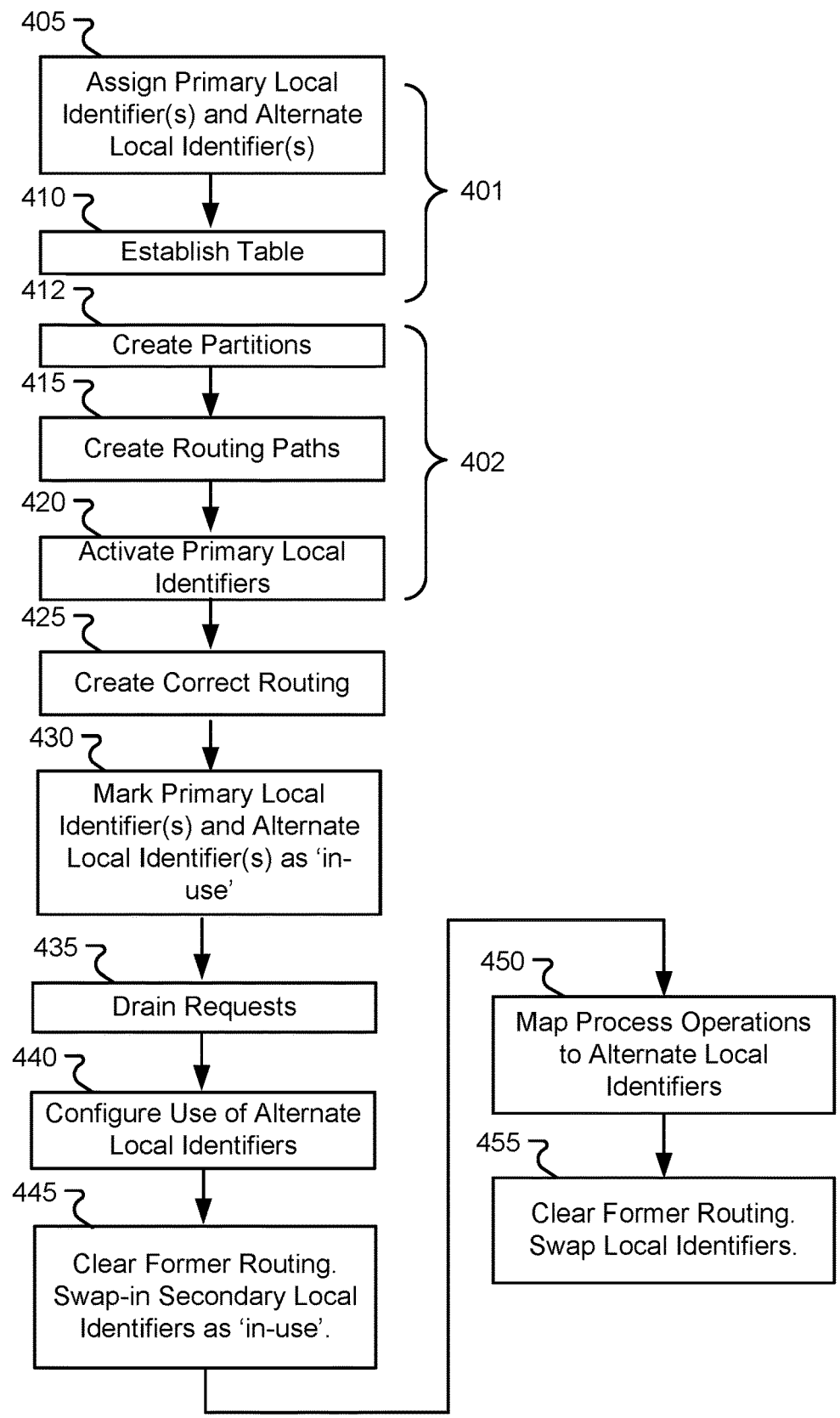
FIG. 4 illustrates an example of a process flow in accordance with aspects of the present disclosure.

FIG. 4 illustrates an example of a process flow 400 in accordance with aspects of the present disclosure. In some examples, process flow 400 may implement aspects of the system 100 and processing system 300 described with reference to FIGS. 1 and 3. For example, the process flow 400 may be implemented by the devices of the system 100 and/or processing system 300 described herein.

In the following description of the process flow 400, the operations may be performed in a different order than the order shown, or the operations may be performed in different orders or at different times. Certain operations may also be left out of the process flow 400, or other operations may be added to the process flow 400.

The process flow 400 is described with reference to an example implementation applicable to mechanisms associated with parallel processing devices 320 and an NVLink fabric described with reference to the processing system 300 of FIG. 3.

The process flow 400 may include a system initialization process 401. In an example, during the system initialization process 401, the subnet manager 345 (at 405) may assign primary local identifier(s) (e.g., primary LIDs) and alternate local identifier(s) (e.g., alternate LIDs) per parallel processing device 320. As described with reference to FIG. 3, the parallel processing devices 320 may be multi-threaded processors (e.g., GPUs, etc.). In an example, for a parallel processing device 320, the subnet manager 345 may assign the primary local identifier for immediate use and the alternate local identifier for cases of link failure/rerouting.

At 410, the global fabric manager 340 may establish a table 337 (e.g., an LMAP table) in the memory of the local fabric manager 336. The table 337 may include primary local identifiers, alternate local identifiers, and corresponding routing paths. In some aspects, the primary local identifiers in the table 337 may be referred to as primary entries, and the alternate local identifiers may be referred to as secondary entries.

The process flow 400 may include a partition creation process 402. At 412, the partition creation process 402 may include creating multiple partitions (e.g., processing partitions 335 as described herein).

At 415, the subnet manager 345 may create routing paths between primary local identifiers in a processing partition 335 (e.g., a processing partition 335-*a*). In some examples, the subnet manager 345 may create routing between all parallel processing devices 320 participating in a processing partition 335 based on the primary local identifiers.

At 420, the global fabric manager 340 may activate the primary local identifiers (e.g., primary entries) in the processing partition 335-a. For example, for the processing partition 335-a (and/or for each processing partition 335), the global fabric manager 340 may activate the routing paths associated with the primary local identifiers.

The process flow 400 may include failure mitigation operations for a processing partition 335 (e.g., processing partition 335-a) affected by a failure event. In some examples, the failure event may be a link failure (or predicted link failure) associated with an interconnect 316 and a parallel processing device 320 of the processing partition 335-a. In another example, the failure event may be a link failure (or predicted link failure) associated with an NVLink interconnect and the parallel processing device 320-a. Accordingly, for example, the failure event may be a link failure associated with a switch 315, an interconnect (e.g., an interconnect 316 and/or an NVLink interconnect), the parallel processing device 320-a, and/or another parallel processing device 320 that is associated with the same processing partition 335 or a different processing partition 335.

In an example, during the failure, the subnet manager 345 may create (at 425) a correct routing for the primary local identifiers, using the alternate local identifiers. In an example, the subnet manager 345 may create and/or select a secondary routing path so as to maintain uninterrupted processing operations associated with at least the processing partition 335-a.

At 430, the subnet manager 345 may mark both the primary local identifiers and alternate local identifiers associated with the processing partition 335-a as 'in-use.'

At 435, the global fabric manager 340 may drain requests associated with each parallel processing device 320 affected by the failure event. In an example, for a processing partition 335-a affected by the failure event, the global fabric manager 340 may drain requests associated with the parallel processing device(s) 320 (included in the processing partition 335) that are affected by the failure event.

At 440, the global fabric manager 340 may configure use of alternate local identifiers (e.g., alternate mapping entries set).

In some aspects, for parallel processing devices 320 associated with the processing partition 335-a, the global fabric manager 340 may drain requests (as described with reference to 435) and configure use of alternate local identifiers (as described with reference to 440) for the parallel processing devices 320 in parallel or sequentially.

Example aspects of the present disclosure support implementing the failure recovery features described herein (e.g., with reference to 435 and 440) for treating a single failure event. Aspects of the present disclosure support implementing the failure recovery features for additional failure events (e.g., implementing the failure recovery features per failure event).

At 445, the subnet manager 345 may clear the former routing for the processing partition 335-a. For example, the subnet manager 345 may clear the use of the primary local identifiers and the primary routing path. In an example, the subnet manager 345 may clear the former routing by swapping-in the secondary local identifiers as the identifiers that are 'in-use,' and in some aspects, by marking the primary local identifiers as 'not in-use.' Accordingly, for example, the subnet manager 345 may support hot swapping between the primary local identifiers and secondary local identifiers.

Aspects of the process flow 400 are described with reference to operations for resetting/changing processing partitions 335 that are not affected by the failure event (e.g., non-affected partitions).

At 450, for a non-affected processing partition 335 (e.g., processing partition 335-b), the global fabric manager 340 may map process operations to alternate local identifiers. The features implemented at 450 may include like aspects of the features implemented at 440.

At 455, for the non-affected processing partition 335, the global fabric manager 340 may clear the former routing and swap the local identifiers in use (e.g., swap in the alternate local identifiers). The features implemented at 455 may include like aspects of the features implemented at 445.

Figure 5:
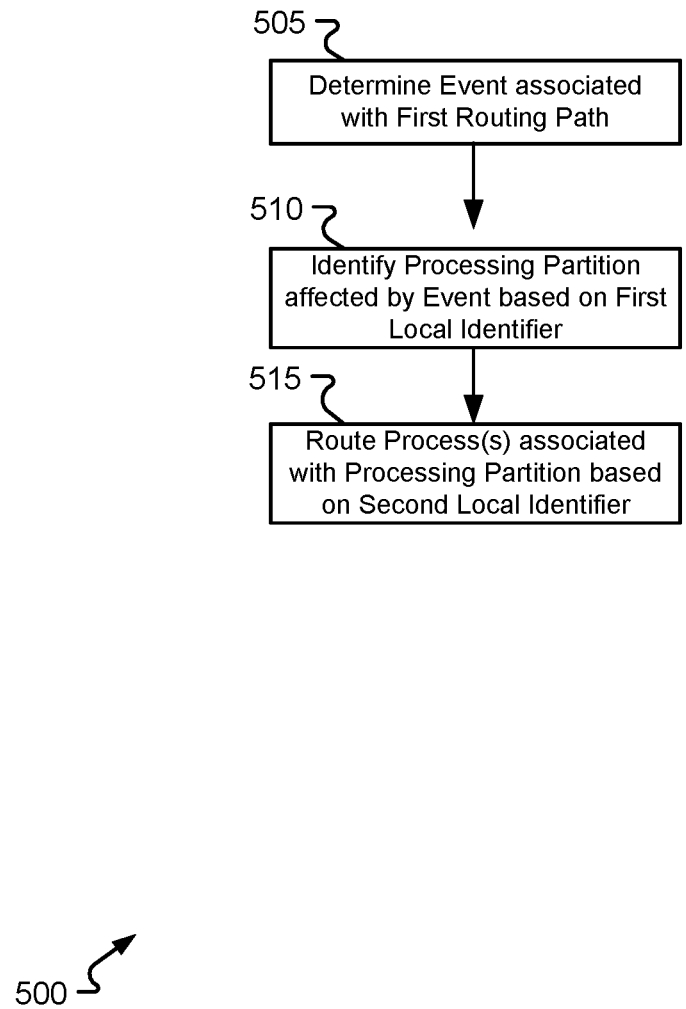
FIG. 5 illustrates an example of a process flow in accordance with aspects of the present disclosure.

FIG. 5 illustrates an example of a process flow 500 in accordance with aspects of the present disclosure. In some examples, process flow 500 may implement aspects of the system 100 and processing system 300 described with reference to FIGS. 1 and 3. For example, the process flow 500 may be implemented by the devices of the system 100 and/or processing system 300 described herein.

In the following description of the process flow 500, the operations may be performed in a different order than the order shown, or the operations may be performed in different orders or at different times. Certain operations may also be left out of the process flow 500, or other operations may be added to the process flow 500.

The process flow 500 may be implemented by an apparatus including: a processor; memory in electronic communication with the processor, wherein instructions stored in the memory are executable by the processor to perform operations of the process flow 500; and a routing fabric connecting a plurality of host channel adapters. The process flow 500 may be implemented by a system including: a routing fabric connecting a plurality of processing devices; and management circuitry.

At 505, the process flow 500 may include determining an event associated with a first routing path.

At 510, the process flow 500 may include identifying a processing partition that is affected by the event based on a first local identifier, wherein the first local identifier is associated with the first routing path and is assigned to the processing partition.

At 515, the process flow 500 may include routing one or more processes associated with the processing partition based on a second local identifier, wherein the second local identifier is associated with a second routing path and is assigned to the processing partition, and wherein the one or more processes are routed using the second routing path.

Figure 6:
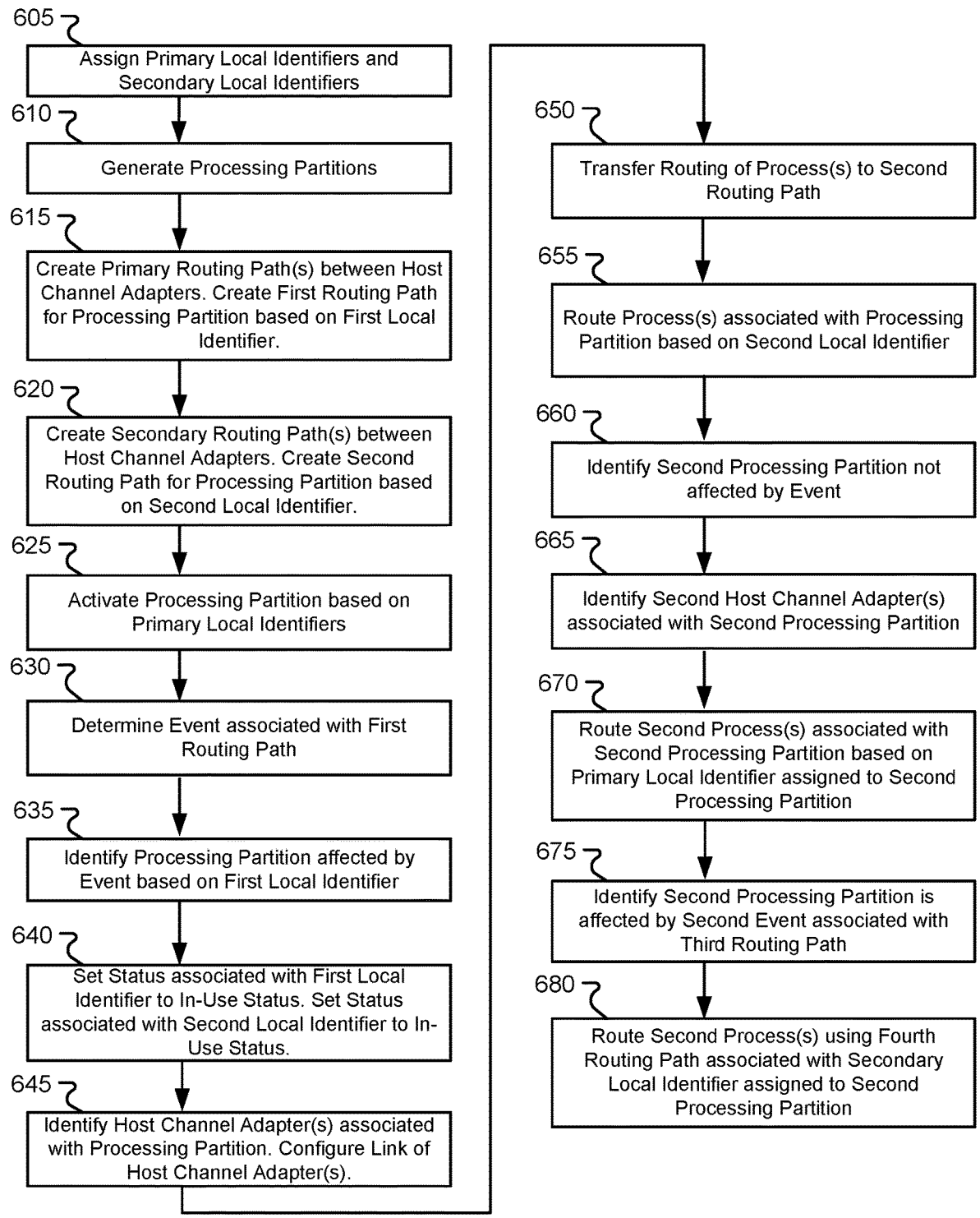
FIG. 6 illustrates an example of a process flow in accordance with aspects of the present disclosure.

FIG. 6 illustrates an example of a process flow 600 in accordance with aspects of the present disclosure. In some examples, process flow 500 may implement aspects of the system 100 and processing system 300 described with reference to FIGS. 1 and 3. For example, the process flow 500 may be implemented by the devices of the system 100 and/or processing system 300 described herein.

In the following description of the process flow 600, the operations may be performed in a different order than the order shown, or the operations may be performed in different orders or at different times. Certain operations may also be left out of the process flow 600, or other operations may be added to the process flow 600.

The process flow 600 may be implemented by an apparatus including: a processor; memory in electronic communication with the processor, wherein instructions stored in the memory are executable by the processor to perform operations of the process flow 600; and a routing fabric connecting a plurality of host channel adapters. The process flow 600 may be implemented by a system including: a routing fabric connecting a plurality of processing devices; and management circuitry.

At 605, the process flow 600 may include assigning a plurality of primary local identifiers and a plurality of secondary local identifiers to a plurality of host channel adapters. In some aspects, the plurality of primary local identifiers include a first local identifier. In some aspects, the plurality of secondary local identifiers include a second local identifier.

In an example, the first local identifier is a primary local identifier assigned to a host channel adapter associated with a processing partition. In another example, the second local identifier is a secondary local identifier assigned to the host channel adapter.

At 610, the process flow 600 may include generating a plurality of processing partitions associated with a plurality of host channel adapters. In some aspects, the plurality of processing partitions include at least the processing partition. In some aspects, a set of host channel adapters of the plurality of host channel adapters is associated with the processing partition.

In an example, at 610, the process flow 600 may include generating a plurality of processing partitions associated with one or more host channel adapters, the plurality of processing partitions including at least the processing partition.

At 615, the process flow 600 may include creating one or more primary routing paths between a set of host channel adapters associated with a processing partition, wherein creating the one or more primary routing paths is based on primary local identifiers respectively assigned to the set of host channel adapters. For example, at 615, the process flow 600 may include creating a first routing path for a processing partition based on a first local identifier.

At 620, the process flow 600 may include creating one or more secondary routing paths between the set of host channel adapters associated with the processing partition, wherein creating the one or more secondary routing paths is based on secondary local identifiers respectively assigned to the set of host channel adapters. For example, at 620, the process flow 600 may include creating a second routing path for the processing partition based on a second local identifier.

At 625, the process flow 600 may include activating the processing partition based on primary local identifiers associated with routing the one or more processes. In an example, the primary local identifiers include at least the first local identifier.

At 630, the process flow 600 may include determining an event associated with the first routing path. In some aspects, the event includes a failure event or a predicted failure event associated with routing the one or more processes using the first routing path.

At 635, the process flow 600 may include identifying the processing partition that is affected by the event based on the first local identifier, wherein the first local identifier is associated with the first routing path and is assigned to the processing partition.

At 640, the process flow 600 may include, in response to identifying the processing partition: setting a status associated with the first local identifier to an in-use status; and setting a status associated with the second local identifier to the in-use status.

At 645, the process flow 600 may include, in response to identifying the processing partition: identifying one or more host channel adapters associated with the processing partition; and configuring a link of the one or more host channel adapters to use secondary local identifiers associated with routing the one or more processes.

At 650, the process flow 600 may include, in response to confirming activation of a drain state of the one or more host channel adapters: transferring routing of the one or more processes to the second routing path; and removing the first routing path.

In some aspects, the one or more processes are associated with an application on a host channel adapter associated with the processing partition; and the transfer of the routing to the second routing path is transparent to the application.

At 655, the process flow 600 may include routing the one or more processes associated with the processing partition based on the second local identifier, wherein the second local identifier is associated with a second routing path and is assigned to the processing partition, and wherein the one or more processes are routed using the second routing path.

At 660, the process flow 600 may include identifying a second processing partition that is not affected by the event.

At 665, the process flow 600 may include identifying one or more second host channel adapters associated with the second processing partition.

At 670, the process flow 600 may include routing one or more second processes associated with the second processing partition based on a primary local identifier assigned to the second processing partition.

At 675, the process flow 600 may include identifying that the second processing partition is affected by a second event associated with a third routing path.

At 680, the process flow 600 may include routing the one or more second processes using a fourth routing path associated with a secondary local identifier assigned to the second processing partition.

Figure 7:
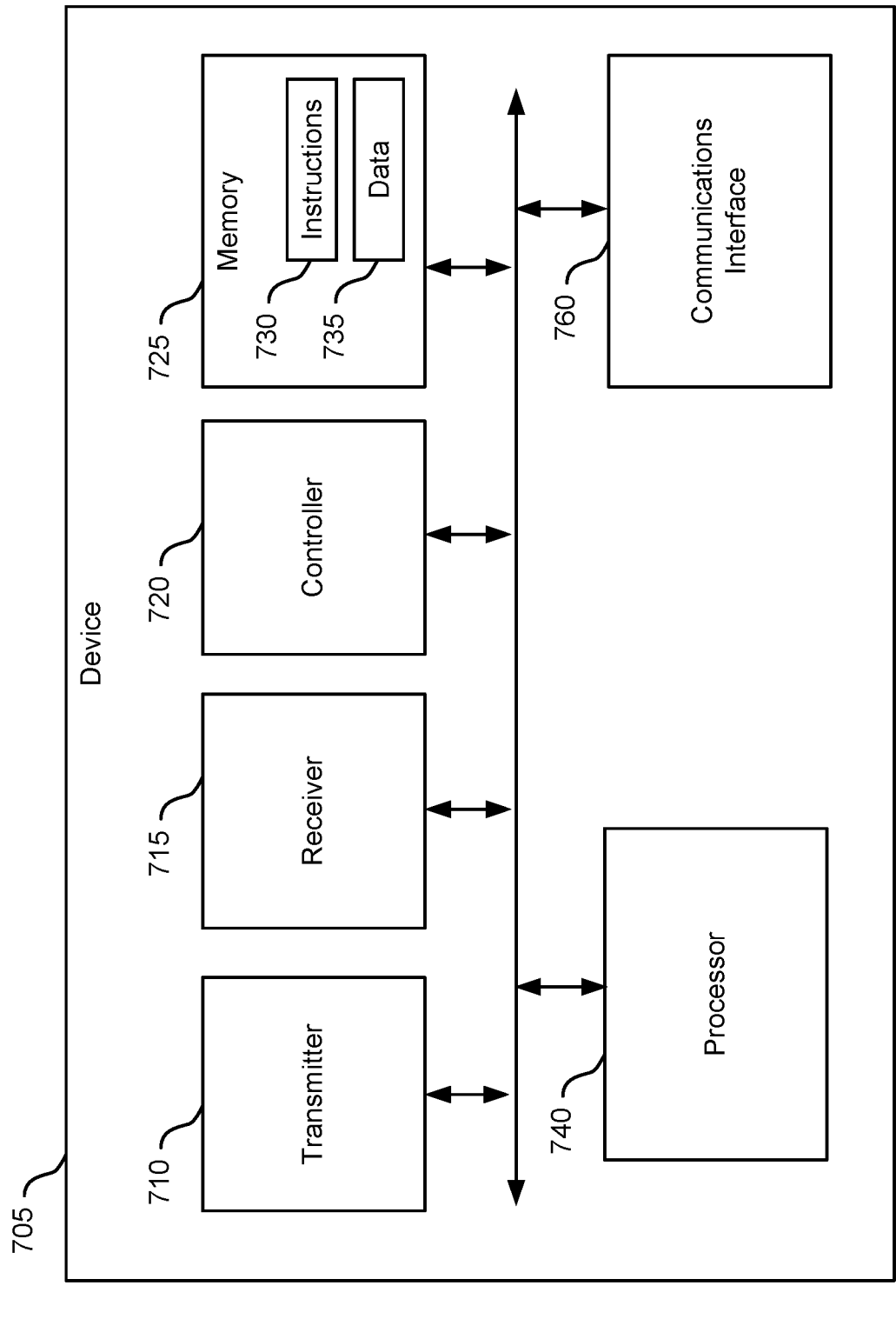
FIG. 7 illustrates an example of a system in accordance with aspects of the present disclosure.

FIG. 7 illustrates an example of a system in accordance with aspects of the present disclosure. The system 700 may include a device 705. In some cases, the device 705 may be referred to as a computing resource. The device 705 may perform any or all of the operations described in the present disclosure. The system 700 and/or device 705 may implement aspects of system 100 and processing system 300 described with reference to FIGS. 1 and 3.

The device 705 may include a transmitter 710, a receiver 715, a controller 720, a memory 725, a processor 740, and a communications interface 760. In some examples, components of the device 705 (e.g., transmitter 710, receiver 715, controller 720, memory 725, processor 740, communications interface 760, etc.) may communicate over a system bus (e.g., control busses, address busses, data busses, etc.) included in the device 705.

The transmitter 710 and the receiver 715 may support the transmission and reception of signals to and from the device 705. In some aspects, the transmitter 710 and the receiver 715 may support the transmission and reception of signals within the device 705. The transmitter 710 and receiver 715 may be collectively referred to as a transceiver. An antenna may be electrically coupled to the transceiver. The device 705 may also include (not shown) multiple transmitters 710, multiple receivers 715, multiple transceivers and/or multiple antennas.

The controller 720 may be located on a same chip (e.g., ASIC chip) as the transmitter 710 and/or the receiver 715. In some cases, the controller 720 may be located on a different chip as the transmitter 710 and/or the receiver 715. In some examples, the controller 720 may be located on a chip of or on a chip of another device 705. In some examples, the controller 720 may be a programmed microprocessor or microcontroller. In some aspects, the controller 720 may include one or more CPUs, memory, and programmable I/O peripherals.

The memory 725 may be any electronic component capable of storing electronic information. The memory 725 may be, for example, random access memory (RAM), read-only memory (ROM), magnetic disk storage media, optical storage media, flash memory devices in RAM, on-board memory included with the processor, EPROM memory, EEPROM memory, registers, and so forth, including combinations thereof.

The memory 725 may include instructions 730 (computer readable code) and data 735 stored thereon. The instructions 730 may be executable by the processor 740 to implement the methods disclosed herein. In some aspects, execution of the instructions 730 may involve one or more portions of the data 750. In some examples, when the processor 740 executes the instructions 730, various portions of the instructions 730 and/or the data 735 may be loaded onto the processor 740.

The processor 740 may correspond to one or multiple computer processing devices. For example, the processor 740 may include a silicon chip, such as a Field Programmable Gate Array (FPGA), an ASIC, any other type of Integrated Circuit (IC) chip, a collection of IC chips, or the like. In some aspects, the processors may include a microprocessor, a Central Processing Unit (CPU), a Graphics Processing Unit (GPU), or plurality of microprocessors configured to execute instructions sets stored in a corresponding memory (e.g., memory 725 of the device 705). For example, upon executing the instruction sets stored in memory 725, the processor 740 may enable or perform one or more functions of the device 705. In some examples, a combination of processors 740 (e.g., an advanced reduced instruction set computer (RISC) machine (ARM) and a digital signal processor (DSP)) may be implemented in the device 705.

The communications interface 760 may support interactions (e.g., via a physical or virtual interface) between a user and the device 705.

Any of the steps, functions, and operations discussed herein can be performed continuously and automatically.

The exemplary apparatuses, systems, and methods of this disclosure have been described in relation to examples of a system 100, a system 300, and a system 700. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

It will be appreciated from the descriptions herein, and for reasons of computational efficiency, that the components of devices and systems described herein can be arranged at any appropriate location within a distributed network of components without impacting the operation of the device and/or system.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed examples, configuration, and aspects.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

In at least one example, architecture and/or functionality of various previous figures are implemented in context of a general computer system, a circuit board system, a game console system dedicated for entertainment purposes, an application-specific system, and more. In at least one example, computer systems (e.g., processing systems) described herein may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

Other variations are within spirit of present disclosure. Thus, while disclosed techniques are susceptible to various modifications and alternative constructions, certain illustrated examples thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed examples (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one example, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain examples require at least one of A, at least one of B and at least one of C each to be present. In addition, unless otherwise noted or contradicted by context, term "plurality" indicates a state of being plural (e.g., "a plurality of items" indicates multiple items). In at least one example, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one example, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one example, code is stored on a computer-readable storage medium, for example, in form of a computer program comprising a plurality of instructions executable by one or more processors. In at least one example, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one example, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one example, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one example, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one example, different components of a computer system have separate processors and different processors execute different subsets of instructions.

Accordingly, in at least one example, computer systems are configured to implement one or more services that singly or collectively perform operations of processes described herein and such computer systems are configured with applicable hardware and/or software that enable performance of operations. Further, a computer system that implements at least one example of present disclosure is a single device and, in another example, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate examples of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one example, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one example, process of obtaining, acquiring, receiving, or inputting analog and digital data can be accomplished in a variety of ways such as by receiving data as a parameter of a function call or a call to an application programming interface. In at least one example, processes of obtaining, acquiring, receiving, or inputting analog or digital data can be accomplished by transferring data via a serial or parallel interface. In at least one example, processes of obtaining, acquiring, receiving, or inputting analog or digital data can be accomplished by transferring data via a computer network from providing entity to acquiring entity. In at least one example, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An apparatus comprising:
   a processor; and
   memory in electronic communication with the processor, wherein instructions stored in the memory are executable by the processor to:
      determine that an event has occurred in a first routing path;
      identify a processing partition that is affected by the event, wherein the processing partition comprises a first port that has been assigned a first local identifier and a second local identifier, wherein the first local identifier is used as an address for the first port to route data between the first port and a second port through the first routing path, and wherein the second local identifier is used as the address for the first port to route the data between the first port and the second port through a second routing path; and
      in response to identifying the processing partition that is affected by the event, swap the first local identifier being used for the first port out for the second local identifier, wherein swapping to the second local identifier enables the data being routed between the first port and the second port over the first routing path to switch to being routed over the second routing path.

2. The apparatus of claim 1, wherein the instructions are further executable by the processor to, in response to identifying the processing partition:
   set a status associated with the first local identifier to an in-use status; and
   set a status associated with the second local identifier to the in-use status.

3. The apparatus of claim 1, wherein the first port comprises a port of a host channel adapter.

4. The apparatus of claim 3, wherein the instructions are further executable by the processor to, in response to confirming activation of a drain state of the host channel adapter:
   transfer routing of the data from the first routing path to the second routing path; and
   remove the first routing path.

5. The apparatus of claim 1, wherein the event comprises a failure event or a predicted failure event associated with routing the data using the first routing path.

6. The apparatus of claim 1, further comprising:
   a routing fabric connecting a plurality of host channel adapters, wherein the first port includes or belongs to one of the plurality of host channel adapters.

7. The apparatus of claim 1, wherein the first port includes or belongs to one of a plurality of host channel adapters, and wherein the instructions are further executable by the processor to:
   assign a plurality of primary local identifiers and a plurality of secondary local identifiers to the plurality of host channel adapters,
   wherein:
      the plurality of primary local identifiers comprise the first local identifier; and
      the plurality of secondary local identifiers comprise the second local identifier.

8. The apparatus of claim 1, wherein the first port includes or belongs to one of a plurality of host channel adapters, and wherein the instructions are further executable by the processor to:
   generate a plurality of processing partitions associated with the plurality of host channel adapters, the plurality of processing partitions comprising at least the processing partition;
   create the first routing path for the processing partition based on the first local identifier; and
   create the second routing path for the processing partition based on the second local identifier.

9. The apparatus of claim 1, wherein the first port includes or belongs to one of a plurality of host channel adapters, and wherein the instructions are further executable by the processor to:
   generate a plurality of processing partitions associated with the plurality of host channel adapters, wherein:
      the plurality of processing partitions comprise at least the processing partition; and
      a set of host channel adapters of the plurality of host channel adapters is associated with the processing partition;
   create one or more primary routing paths between the set of host channel adapters associated with the processing partition, wherein creating the one or more primary routing paths is based on primary local identifiers respectively assigned to the set of host channel adapters; and
   create one or more secondary routing paths between the set of host channel adapters associated with the processing partition, wherein creating the one or more secondary routing paths is based on secondary local identifiers respectively assigned to the set of host channel adapters.

10. The apparatus of claim 1, wherein the instructions are further executable by the processor to:

activate the processing partition based on primary local identifiers, wherein the primary local identifiers comprise at least the first local identifier.

11. The apparatus of claim 1, wherein the instructions are further executable by the processor to:
identify a second processing partition that is not affected by the event;
identify one or more second host channel adapters associated with the second processing partition; and
route data associated with the second processing partition based on a primary local identifier assigned to the second processing partition.

12. The apparatus of claim 11, wherein the instructions are further executable by the processor to:
determine that the second processing partition is affected by a second event associated with a third routing path; and
route the data associated with the second processing partition using a fourth routing path associated with a secondary local identifier assigned to the second processing partition.

13. The apparatus of claim 1, wherein the first port includes or belongs to a host channel adapter, and wherein the instructions are further executable by the processor to:
transfer routing of the data from the first routing path to the second routing path, wherein:
the data is associated with an application on the host channel adapter.

14. A system comprising:
a routing fabric connecting a plurality of processing devices; and
management circuitry configured to:
determine that an event has occurred in a first routing path of the routing fabric;
identify a processing partition that is affected by the event, wherein the processing partition comprises a first processing device that has been assigned a first local identifier and a second local identifier, wherein the first local identifier is used as an address for a first port of the first processing device to route data between the first port and a second processing device through the first routing path, and wherein the second local identifier is used as the address for the first port to route the data between the first port and the second processing device through a second routing path; and
in response to identifying the processing partition that is affected by the event, swap the first local identifier being used for the first processing device out for the second local identifier, wherein swapping to the second local identifier enables the data being routed between the first port and the second processing device over the first routing path to switch to being routed over the second routing path.

15. The system of claim 14, wherein the plurality of processing devices comprise a plurality of host channel adapters.

16. The system of claim 14, wherein the management circuitry is configured to, in response to identifying the processing partition:
set a status associated with the first local identifier to an in-use status; and
set a status associated with the second local identifier to the in-use status.

17. The system of claim 14, wherein the first processing device comprises a host channel adapter.

18. The system of claim 14, wherein the management circuitry is configured to, in response to confirming activation of a drain state of the plurality of processing devices:
transfer routing of the data to the second routing path; and
remove the first routing path.

19. A method comprising:
determining that an event has occurred in a first routing path of a routing fabric comprising a plurality of host channel adapters;
identifying a processing partition that is affected by the event, wherein the processing partition comprises a first host channel adapter that has been assigned a first local identifier and a second local identifier, wherein the first local identifier is used as an address for a first port of the first host channel adapter to route data between the first port and a second host channel adapter through the first routing path, and wherein the second local identifier is used as the address for the first port to route the data between the first host channel adapter and the second host channel adapter through a second routing path; and
in response to identifying the processing partition that is affected by the event, swapping the first local identifier being used for the first host channel adapter out for the second local identifier, wherein swapping to the second local identifier enables the data being routed between the first port and the second host channel adapter over the first routing path to switch to being routed over the second routing path.

* * * * *